March 12, 1929.  H. ROSSI  1,705,419
FISHING SIGNAL
Filed Jan. 19, 1928
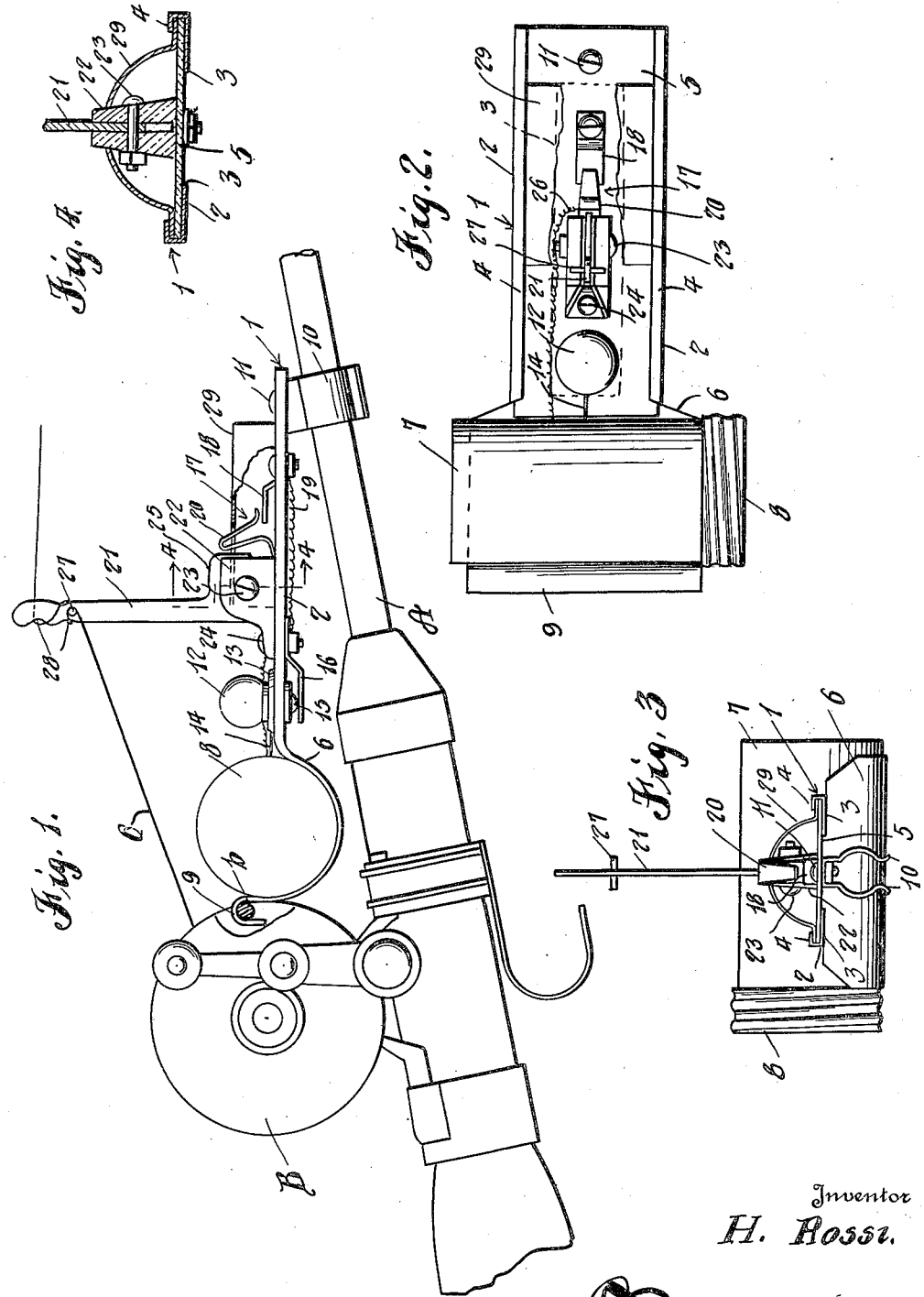
Inventor
H. Rossi.

Patented Mar. 12, 1929.

1,705,419

UNITED STATES PATENT OFFICE.

HENRY ROSSI, OF SCHENECTADY, NEW YORK.

FISHING SIGNAL.

Application filed January 19, 1928. Serial No. 247,924.

The invention relates to signaling apparatus adapted to be applied to a fishing rod and operatively connected to the fishing line so that when a fish is caught pull on the line will actuate the signal to indicate to the fisherman that he has a "bite." The device includes a visual signal consisting of an electric lamp actuated by a battery carried by the device and is particularly visible to fisherman when fishing at night.

A further object of the invention is the provision of a fishing signal consisting of a base member having means to secure it to a fishing rod and reel, and provided with means for carrying an electric circuit including a battery and signal and an open switch, and providing a pivoted arm having a cam member to engage the movable member of the open switch to move it into closed position, said arm being adapted to engage a fishing line from the reel and to be actuated into position to close the switch when a fish "bites."

The invention will be described in detail hereinafter and will be found illustrated in the accompanying drawings, in which Figure 1 is a view of a fragment of a conventional fishing rod showing a conventional fishing reel engaged thereon and the fishing signal supported by said rod and reel and arranged to be actuated by the fishing line, the parts being shown in side elevation.

Figure 2 is a top plan view of the fishing signal assembly,

Figure 3 is a front end view, and

Figure 4 is a transverse sectional detail on a plane indicated by the line 4—4 of Figure 1.

In the drawings similar reference characters will be used to designate corresponding parts in all of the views.

The fishing signal is shown applied to a a conventional fishing rod A having a reel B mounted thereon in the usual manner, C designating the fishing line. The signaling device comprises a base member 1 consisting of a base plate 2 having a longitudinal slot 3 therein and its side edges bent back on the body of the plate 2 as shown at 4 to enclose a plate of insulation 5 such as bakelite, vulcanized fibre, or the like, said base member being also provided with a transversely arranged recess 6 to support the case 7 having a threaded cap 8 to house a dry cell battery for the operation of the signal to be hereinafter described, and its rear extremity provided with a hook member 9 to engage one of the side wall spacing rods c of the reel B. 10 indicates a spring clip secured to the front end of the base member 1 by means of a bolt or rivet 11 secured to the plate 5 of insulation and the front end of the plate 2, said spring clip being adapted to engage the fishing rod in advance of the fishing reel substantially as indicated in the drawings, Figure 1.

An electric lamp bulb 12 is mounted in a socket 13 supported by the plate 5 and the socket 13 is electrically connected with the battery within the casing 7 by means of a conductor 14. The lamp 12 is of the single contact type and when mounted in the socket 13 as shown in Figure 1 of the drawings, the contact 15 is engaged by a contact member 16 also secured to the plate 5. A switch 17 is also provided on the plate 5 and comprises a contact member 18 in circuit with contact member 16 by means of conductor wire 19, and a V-shaped spring tongue 20 also secured to plate 5 and normally out of contact with contact member 18. An arm 21 is pivotally mounted between ears 22 on pivot pin 23, said ears being preferably made of insulating material and secured to the plate 5 by means of a rivet or bolt 24 that also secures the contact member 16 to said plate and the arm 21 has a cam 25 adapted to engage the spring tongue 20 when the arm is moved into a lowered position from that shown in the full line position of Figure 1 to move the contact member 20 into engagement with the contact member 18. The spring tongue 20 is in circuit with the battery within the casing 7 by means of conductor wire 26 and it will be apparent that when the switch 17 is closed by contact of the members 20 and 18, the lamp 12 will be ignited. The fishing line C is adapted to be coiled around the upper end of the arm 21 as shown in Figure 1 of the drawings, said arm being provided with a transversely arranged pin 27 and the upper end of the arm 21 with recesses 28, the fishing line being wrapped around said cross pin 27 and engaged in said recesses 28 to insure operation of the arm to move it into lowered position when the line is engaged by a fish.

A hood 29 is provided to cover the switch and protect the contacts from the weather, said hood being secured in position at its edges by being engaged by the turned back portion 4 of the base plate 2.

In operation it will be understood that when the apparatus is arranged as shown in Figure 1, a pull on the fishing line C by a biting fish will swing the arm 21 forwardly and downwardly so that the cam 25 by engaging the spring tongue 20 will move it into engagement with the contact member 18 and the lamp 12 will be ignited and thus indicate to the fisherman that a fish is caught, and furthermore that the device is so sensitive that a nibble may be detected by an intermittent ignition of the lamp 12.

What is claimed is:—

1. A signaling apparatus comprising a base member adapted to be applied to a fishing rod, a hook on said base member to engage a spacing rod of a fishing reel, a signal apparatus carried by said base including a battery, a signal, and electrical conductors connecting said battery and signal, a normally open switch arranged in one of the conductors, an arm pivotally supported on the base member and adapted to engage a fishing line, and a cam on said arm to engage a member of the switch to close the electric circuit from the battery to the signal.

2. A signaling apparatus comprising a base member adapted to be supported by a fishing rod and a fishing reel thereon, an electrical signal apparatus carried by said base member and including a signal and a switch controlling said signal, said switch including a spring tongue contact member normally spaced from another contact member, an arm pivotally supported on said base and adapted to engage a fishing line from said reel, and a cam on said arm engaged by said spring tongue to hold the arm in raised position and adapted to move the tongue into contact with the other contact member when the fishing line is pulled by a caught fish to actuate the signal.

In testimony whereof I affix my signature.

HENRY ROSSI.